June 7, 1932.　　　　E. S. MATTERN　　　　1,862,229
TANK CLOSURE RETAINING AND LOCKING DEVICE
Filed Aug. 24, 1931　　　2 Sheets-Sheet 1
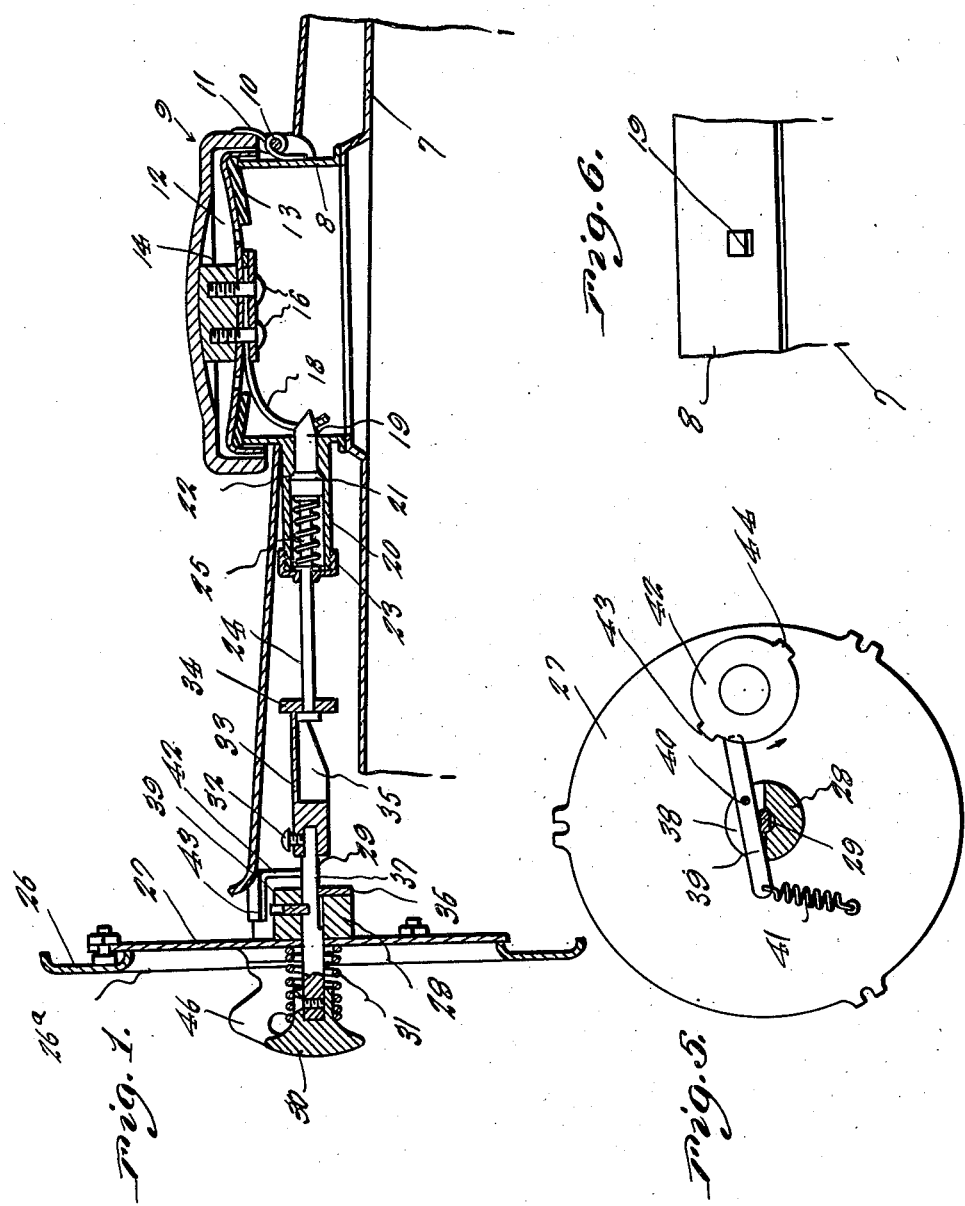
Inventor
*Earl S. Mattern*
By *Clarence A. O'Brien*
　　Attorney June 7, 1932. E. S. MATTERN 1,862,229
TANK CLOSURE RETAINING AND LOCKING DEVICE
Filed Aug. 24, 1931 2 Sheets-Sheet 2
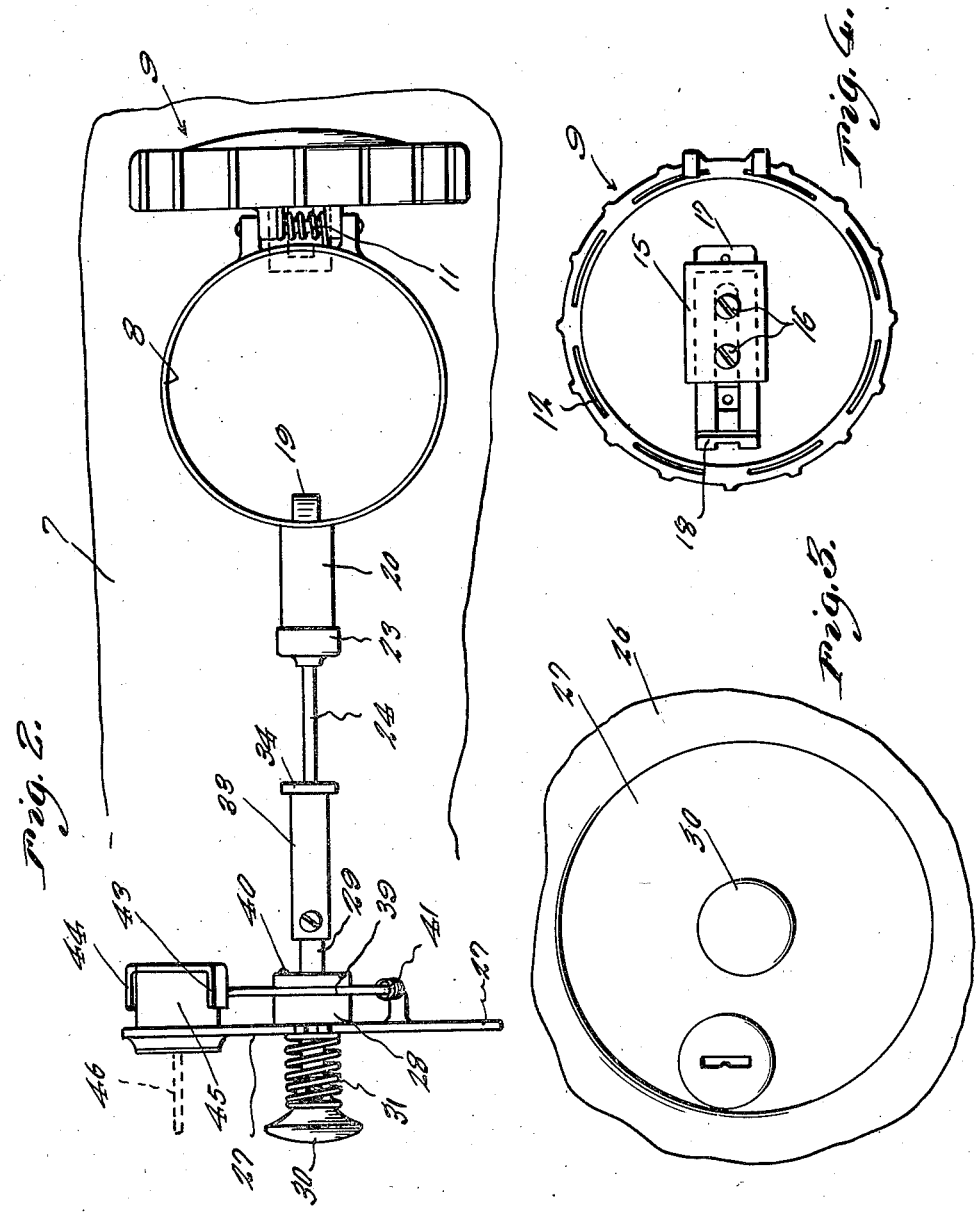
Inventor
*Earl S. Mattern*
By *Clarence A. O'Brien*
Attorney Patented June 7, 1932

1,862,229

UNITED STATES PATENT OFFICE

EARL S. MATTERN, OF PITMAN, PENNSYLVANIA

TANK CLOSURE RETAINING AND LOCKING DEVICE

Application filed August 24, 1931. Serial No. 559,086.

This invention relates to motor vehicle accessories in general, and has more particular reference to an improved fuel tank closure and lock controlled retaining device therefor.

The purpose of the invention is to provide remote controlled means for use by the driver of the car thereby allowing him to have full control of the fuel tank cap so as to prevent unauthorized operation of such top while at the same time permitting use of the cap by authorized representatives when replenishing the tank with fuel.

One structural feature of the invention is predicated upon the use of a hingedly mounted spring opened properly ventilated closing cap associated with the filler neck, said cap being provided with an adjustable keeper, and said neck being provided with a spring retracted and projected latch cooperable with said keeper for maintaining the cap closed under ordinary or normal conditions.

A further feature of the invention is founded on the use of a key-controlled trip actuating mechanism for permitting automatically operated spring means to come into play for retracting the latch and releasing the cap when desired by the operator of the car.

In carrying the inventive conception into actual practice, I have achieved the desired results through the selection of variable parts, organized in an effective manner, securing positive and dependable operation whereby to allow the invention to fulfill the requirements of a structure of this type in an appreciably satisfactory manner.

In the drawings:

Figure 1 is a view in section and elevation showing the general assembly and developed in accordance with the present invention.

Fig. 2 is a top plan view with the parts in elevation.

Fig. 3 is a front elevation of the visible part of the structure seen from the front of the instrument board.

Fig. 4 is a bottom plan view of the especially formed closing cap.

Fig. 5 is a detail sectional view.

Fig. 6 is a fragmentary elevation.

In the drawings in Fig. 1, the numeral 7 designates the fuel tank provided with a filler neck 8 with which the closing cap 9 is connected. The cap is hingedly mounted on the neck as indicated at 10 and associated with the neck and hinge is a spring 11 for automatically swinging the cap to open position.

It will be noticed that the cap is formed with vent ducts 12 suitable in construction for letting in atmospheric air. The numeral 13 merely designates a packing ring or gasket, to insure fluid-tight closure between the neck and cap.

Fastened to the center of the cap is a block or the like 14 and secured to this by a plate 15 and bolts 16 is the keeper. This keeper has a slotted shank 17 for radial adjustment purposes, and a hooked bill 18 adapted for alinement and cooperation with the beveled end of the latch 19. The latch is of special design.

It will be noticed for example in Fig. 1 that the latch is mounted in a cylindrical casing 20 and has a valve element 21 cooperable with the seat 22 to avoid leakage. This cylinder is provided with a cap 23 thru which the headed stem 24 of the valve-latch is slidable. In this connection it will be observed that a coiled spring 25 is confined in the cylinder by the cap and surrounds the stem or rod 24 and bearing against the valve 21 to keep it against the seat 22.

I next call attention to the numeral 26 which represents the instrument board cut out as at 26a to accommodate the supporting disk 27 on which the control mechanism is supported. Mounted concentrically on this disk and on the front side thereof is a collar 28 bored for slidable passage of a shaft 29. This shaft is provided on its operating end with a knob 30, and surrounding the stem and bearing at one end against the knob is a heavy coiled spring 31, and the spring bears at its opposite end against the plate 27.

The shaft 29 is connected by a set screw 32 to a coupling 33, and said coupling has an apertured end portion 34 with which the headed end of the latch rod 24 is cooperable. This coupling is recessed at 35 to provide the desired clearance space to provide a trip joint connection between the shaft 29 and the rod 24. I desire to call attention to the fact that the spring 31 is much heavier and longer than the spring 25 and is designed to overcome the tension of the spring 25 for retracting the latch 19 from the keeper 18.

The collar 28 is provided with a guide plate 36 cooperable with the flattened under side 37 of the shaft 29 to prevent rotation of the shaft. Thus the shaft may slide but cannot rotate. In addition as seen in Fig. 5, the collar has its upper half portion formed with a kerf 38 in which a release lever 39 is pivoted as indicated at 40. One end of the lever is fastened to a spring 41 anchored on the disk 27. The spring holds down one end of the lever and maintains said end in the kerf 38 as well as in a notch formed in the upper half portion of the shaft 29 as seen in Fig. 1.

The free end of this lever is adapted to be actuated by a rotary trip member 42 provided with diametrically opposite laterally directed fingers 43 and 44 successively engageable with the free end of the lever when the member 42 is turned in a direction of the arrows indicated in Fig. 5. This trip member 42 is operated by the rotary cylinder lock 45 and a suitable key 46 is provided therefor. In other words in order to actuate the member 42 it is necessary to insert a key and turn it, thus bringing either one of the fingers 43 or 44 into engagement with the free swingable end of the pivoted lever 29.

In the drawings, the mechanism is shown for holding the cap 9 in closing position on the filler neck 8. At this time the latch 19 is projected into the slot of the curvate end of the keeper 18. As before stated the keeper is made adjustable so as to bring about the desired exacting alinement between the latch and the keeper. Moreover, the latch has the additional function of serving as a valve and it is evident that the spring 25 holds the valve seated to avoid leakage of fuel by way of the latch mounting. The cap itself is suitably vented and appropriate packing is included to secure appropriate ventilation and avoid leakage.

The key controlled mechanism on the instrument board 26 is so positioned as to compress spring 31 when the lever 39 is held down in the kerf of the shaft 29. By inserting the key and turning the barrel of lock 45, the device 42 is actuated. As before stated, either one or the other of the trip fingers 43 or 44 comes into engagement with the free end of the releasing lever 39. This swings the lever on the pivot 40 against the action of the spring 41 and lifts the lever from the notch in the shaft 29. As soon as the shaft is released, the spring 31 comes into play and slides the shaft 29 in a direction from right to left in Fig. 1. This exerts a longitudinal pull on the coupling 33 and a corresponding pull on the latch rod 24, and hence the latch 19 is retracted from the keeper 18 and the spring 11 swings the cover 9 to open position.

In order to set the mechanism again, for the closing of the cap, the operator presses the button 30 in a direction from left to right in Fig. 1, thus compressing the spring 31 and as the shaft 29 moves in a certain distance, the lever 39 again drops down into the notch 38 to hold the shaft in this position. This relieves the compression on the spring 25, allowing it to come into play to again project the latch into the path of movement of the keeper 18 as the cover is swung down.

Obviously, as the keeper passes the latch in this closing operation, the spring 25 is momentarily compressed and the special coupling 33 allows the rod 24 to move its headed end into the recess 35 to support the necessary slip joint and clearance action to permit tripping and resetting automatically of the latch 19.

It is evident that the structure requires a special key for releasing the control mechanism. However the control mechanism is located on the instrument board and the operating connection between the instrument board and the latch on the filler neck may be of any length depending upon the position of the tank 7. In other words the tank may be at the rear of the machine, under which condition, the operating connection would be sufficiently long to accommodate said tank and its closing cap.

In the arrangement shown the structure is for a Ford type machine where the tank is within the vicinity of the instrument board, for which reason the parts are shown somewhat short.

It is thought from the foregoing description that the advantages and novel features of the invention will be readily apparent.

It is to be understood that changes may be made in the construction and in the combination and arrangement of the several parts, provided that such changes fall within the scope of the appended claim.

Having thus described my invention, what I claim as new is:

In a structure of the class described, a support, a shaft movable longitudinally through the support and having a knob, an expansion spring confined between the knob and the support, a collar on the shaft, said collar and said shaft being provided with transverse registering notches, a lever pivoted intermediate the ends thereof to one side wall of the notch in said collar and adapted to extend into the notch in said shaft to move the same against endwise movement, a spring anchored at one end to said lever and at the other end to said support, and means to actuate said lever, and a connecting element secured to said shaft.

In testimony whereof I affix my signature.

EARL S. MATTERN.